Jan. 2, 1923.
J. H. FULLMER.
MICROMETER CALIPER.
ORIGINAL FILED JUNE 21, 1920.
1,440,824.
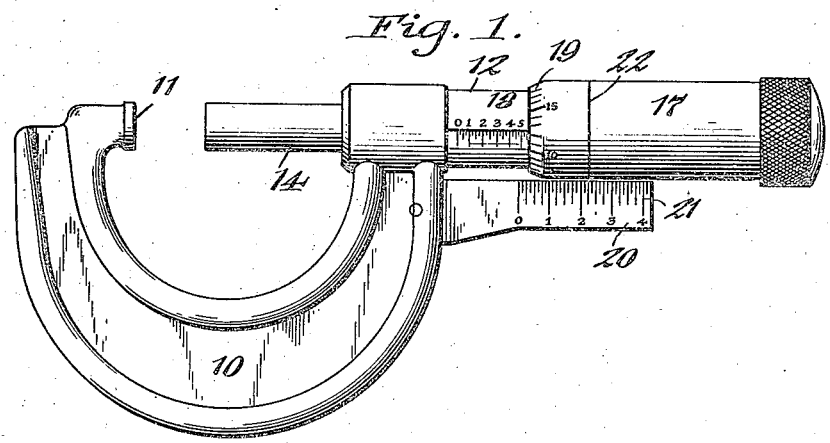
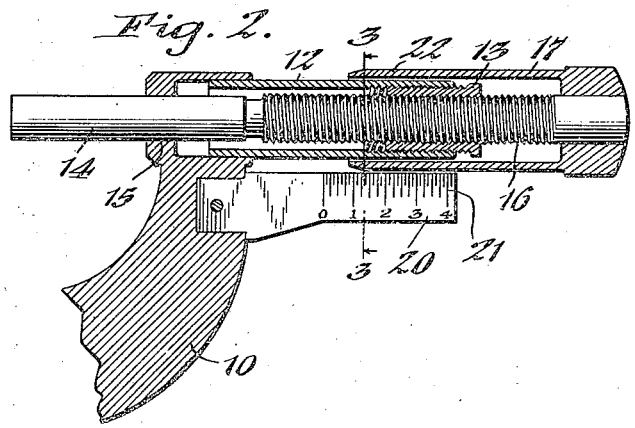
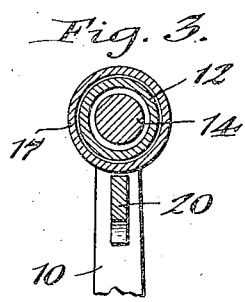
Inventor,
John H. Fullmer
by Geyer & Popp
Attorneys.

Patented Jan. 2, 1923.

1,440,824

UNITED STATES PATENT OFFICE.

JOHN H. FULLMER, OF BUFFALO, NEW YORK.

MICROMETER CALIPER.

Application filed June 21, 1920, Serial No. 390,310. Renewed April 28, 1922. Serial No. 557,195.

*To all whom it may concern:*

Be it known that I, JOHN H. FULLMER, a citizen of the United States, residing at Buffalo, in the county of Erie and State of New York, have invented new and useful Improvements in Micrometer Calipers, of which the following is a specification.

This invention relates to a micrometer caliper and has the object to provide a caliper of this character which will permit of a more accurate reading and adjustment of the caliper as well as a double reading in order to reduce the liability of making mistakes.

In the accompanying drawings;

Figure 1 is a side elevation of a caliper equipped with my improvement. Figure 2 is a fragmentary longitudinal section of the caliper. Figure 3 is a cross section on line 3—3, Fig. 2.

Similar characters of reference indicate corresponding parts throughout the several views.

10 represents the body or frame of the caliper which is preferably of the well known U-shape form and provided on one of its ends with a gage anvil 11 while its opposite end is provided with a hollow post or column 12 which is arranged in line with said anvil. The outer end of this post is provided with an internal screw thread which receives the external screw thread of an adjusting sleeve 13.

14 represents the gage stem the inner or front end of which is movable toward and from the gage anvil for measuring sizes and distances between these gage members. The gage stem is guided in a way 15 on the adjacent part of the body and has its outer end formed into a screw 16 which engages with an internal screw thread in the adjusting sleeve. Secured to the outer end of the screw is a thimble 17 which is rotatable around the tubular post and also movable lengthwise thereof.

Arranged lengthwise on the side of the post 12 is a longitudinal scale 18 which co-operates with a circumferential scale 19 arranged around the front or inner end of the thimble, these scales being preferably graduated according to the French, metric or decimal system so that reading of the same will be in thousandths of an inch, although any other suitable graduation may be employed, if desired.

Projecting laterally from that end of the body which carries the post and preferably arranged lengthwise along the underside of the post and thimble is a gage arm 20 which is provided on its side with a longitudinal scale 21 which co-operates with a circumferential mark 22 on the exterior of the thimble, this mark being preferably in the form of a ring. The longitudinal scale of the gage arm is preferably graduated in fractions of an inch according to the English lineal measuring system, but corresponds in its dimensions to the longitudinal scale of the post.

In the example of graduations shown in the drawings, the fractional graduations of the scale on the gage arm represent a total length of one inch which is coarsely divided by numbered lines into quarter inches and by still finer lines into sixteenths and thirtyseconds. The decimal scale on the post or column is divided coarsely by numbered lines into one hundred thousandths, and by finer subdivision lines between the numbered lines, each of the fine subdivisions representing twenty five one-hundred thousandths. The decimal scale on the thimble is divided coarsely by numbered lines from zero to 25, each of which represents five-one hundred thousandths, and by finer subdivision lines between these coarse numbered lines each of which represents one-one hundred thousandth. In the position of the parts of the caliper shown in the drawings the same represents a measurement of $\frac{9}{16}$ of an inch on the fractional scale and .5625 inch on the decimal scale, which are the equivalent of each other.

In using this caliper, the thimble is turned until the gage post is arranged at the desired distance from the gage anvil. During this adjustment the thimble travels lengthwise of the gage arm and the post so that the coarse reading of the measurement can be taken by noting the position of the mark 22 of the thimble relatively to the scale on the gage arm and also by noting the position of the front end of the thimble relatively to the longitudinal scale on the post, and the position of the annular scale on the thimble relatively to the longitudinal line of the scale on the post. By means of this double reading, a much more accurate measurement can be made than is possible by reading the coarse measurement on the longitudinal scale of the post and the fine measurement on the thimble. This is due to the fact that it is difficult and practically impossible, except when exercising the greatest care, to note whether the inner or front end of the thimble is just on a certain graduation of the post scale or slightly on one side or the other of the same, and thus render the measurement inaccurate to that extent. Inasmuch, however, as the position of the circular mark 22 on the thimble with reference to the longitudinal scale on the gage arm permits the operator at all times to clearly see whether the mark 22 is in line with a certain graduation on the gage arm or slightly in front or in rear of the same, it is possible to determine with absolute accuracy just what the measurement is.

A caliper thus equipped not only permits of closer, safer and easier reading, but it also permits of double reading and checking of measurements by first reading one system of graduations and then the other and thus lead to the detection of any errors, which may have occurred and which would be possible if only one of these readings were made.

This addition to a caliper of usual construction can be made without material increase in cost and without affecting the normal operation of the instrument.

Although the drawings show the metric scale on the post 12 and the inch scale on the arm 20, it is to be understood that any other suitable denomination of lineal measurement may be employed so that the reading of a scale of one denomination may be readily converted into a scale of another denomination.

I claim as my invention:

A micrometer caliper comprising a body provided at one end with an anvil and at its other end with a hollow post having a longitudinal scale, an adjustable stem having a screw connection with said post and provided with a thimble, and an arm mounted on said body and arranged lengthwise of said thimble and provided with a longitudinal scale, and said thimble being provided with a circumferential scale co-operating with said scale on the post and a circumferential mark co-operating with the scale on said arm, the scales on the post and thimble being graduated according to one denomination and the scale on the arm being graduated according to another denomination to permit of reading in connection with said mark on the thimble.

JOHN H. FULLMER.